W. GILBERT.
Hand-Seeder.
No. 55,850. Patented June 26, 1866.
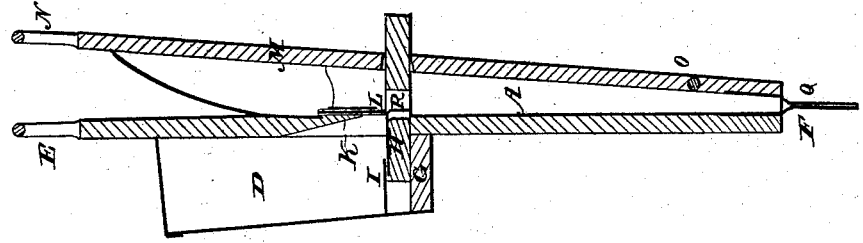
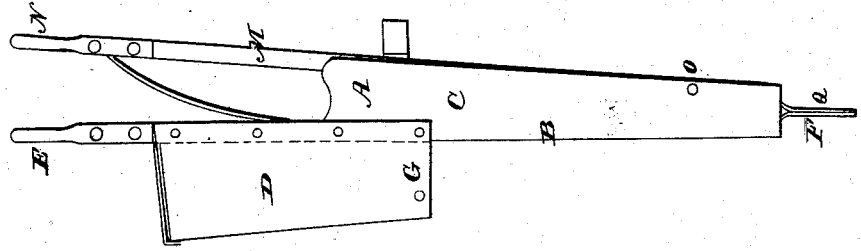

United States Patent Office.

WILLIAM GILBERT, OF BARDSTOWN, KENTUCKY.

IMPROVEMENT IN HAND CORN-PLANTERS.

Specification forming part of Letters Patent No. 55,850, dated June 26, 1866.

*To all whom it may concern:*

Be it known that I, WILLIAM GILBERT, of Bardstown, in the county of Nelson and State of Kentucky, have invented a new and useful Improvement in Hand Corn-Planters, of which the following is a full, clear, and exact description, reference being had to the annexed drawings, making a part of this specification, and in which—

Figure 1 is a side elevation of a hand corn-planter to which my improvement is attached, and Fig. 2 is a vertical central section through the same.

It is the object of my invention to construct a hand seed-planter that can be operated by one hand effectively; and to this end my invention consists in combining in a hand seed-planter a hopper-box to carry the seed and a spring-back, carrying a sliding valve, to deliver the seed at intervals in such a manner as that the handles to the box and back can be grasped in one hand, so that by opening and closing the hand upon the handles the seed can be planted.

To carry out the objects of my invention I construct a hopper-box, A, of wood, consisting of a plate, B, side pieces, C, and a hopper, D, with an open handle, E, at its upper end, and shod with an iron plate, F, at the bottom. The bottom of the hopper D consists of a piece of wood, G, secured to the front of the plate B, and having a groove in its center to receive the valve-block H, which is free to slide beneath a metal plate, I, that covers the groove. The inside of the plate B above the bottom of the hopper is chamfered at K, with an opening, L, at its back, to permit the valve-block H to vibrate into the hopper D. The hopper-box A has a back, M, which has a handle, N, and is pivoted at O to the sides C of the box in such a manner as to vibrate within the sides on its pivot. The bottom of the back M is also shod with metal Q, and the metal shoes of the box and back are bent inward, so that when they are closed together the back will be flush with the rear edges of the sides of the box, and the parts when at rest are kept in this position by a metal spring attached to the plate B, and extending upward to press upon the top of the back M. Directly opposite the opening L of the plate B a valve-block, H, is secured upon a pin in the back M in such a manner as to have a free horizontal reciprocatory movement into and out of the hopper. The valve-block is provided with an opening, R, through which corn in the grain can pass freely.

The operation is as follows: The hopper being filled with shelled corn, the farmer takes the planter by the handles, which are close enough together to let the fingers embrace both, and starts to planting. Pressing the handles together, the valve-block enters the hopper and receives into its opening seed enough for a single hill. The fingers embracing the handle of the back are now relaxed, when the spring forces the back away from the plate that supports the hopper and closes the shoes, when the seed escapes from the valve-block into the bottom of the hopper-box. The shoes are now inserted in the ground properly prepared to receive the seed, when the handles are again compressed together, the shoes part and let the corn fall from the planter, and at the same time the opening in the valve-block receives a new supply of corn from the hopper, which is withdrawn by again relaxing the fingers, and thus the repetition of these movements continues the planting with marked regularity and great ease to the farmer.

I have described the spring-piece M as a back, but it may be called indifferently the "front" of the hopper box, for the result is the same.

It is obvious that, although I have limited the description of my invention to the planting of corn, it may be advantageously used for planting other grain with marked economy in both time and labor.

What I claim as my invention, and desire to secure by Letters Patent, is—

The hand seed-planter constructed, arranged, and operating substantially in the manner described, for the purpose set forth.

In testimony whereof I have hereunto subscribed my name.

WILLIAM GILBERT.

Witnesses:
JAMES MINO, M. D.,
W. N. BECKHAM.